United States Patent
He et al.

(10) Patent No.: US 10,956,939 B2
(45) Date of Patent: *Mar. 23, 2021

(54) MOBILE MEDIA DELIVERY SYSTEM AND METHODS OF USING THE SAME

(71) Applicants: David Quan He, Johns Creek, GA (US); Ming Jiang, Alpharetta, GA (US)

(72) Inventors: David Quan He, Johns Creek, GA (US); Ming Jiang, Alpharetta, GA (US)

(73) Assignees: David Q. He, Johns Creek, GA (US); Ming Jiang, Alpharetta, GA (US)

( * ) Notice: Subject to any disclaimer, the term of this patent is extended or adjusted under 35 U.S.C. 154(b) by 429 days.

This patent is subject to a terminal disclaimer.

(21) Appl. No.: 15/644,820

(22) Filed: Jul. 9, 2017

(65) Prior Publication Data
US 2019/0012702 A1    Jan. 10, 2019

(51) Int. Cl.
G06Q 30/02    (2012.01)

(52) U.S. Cl.
CPC ..... *G06Q 30/0259* (2013.01); *G06Q 30/0266* (2013.01); *G06Q 30/0267* (2013.01); *G06Q 30/0272* (2013.01)

(58) Field of Classification Search
CPC ................................................ G06Q 30/0259
USPC ....................................................... 705/14.58
See application file for complete search history.

(56) References Cited

U.S. PATENT DOCUMENTS

| | | | |
|---|---|---|---|
| 6,060,993 A | 5/2000 | Cohen | |
| 6,898,517 B1 | 5/2005 | Froeberg | |
| 7,449,998 B1 | 11/2008 | Au et al. | |
| 9,775,003 B2 * | 9/2017 | Ciecko | H04W 4/029 |
| 10,416,947 B2 * | 9/2019 | Zenoff | G09G 3/3208 |
| 2012/0131170 A1 * | 5/2012 | Spat | H04L 67/04 709/223 |
| 2012/0303458 A1 | 11/2012 | Schuler, Jr. | |
| 2014/0040016 A1 * | 2/2014 | Amla | G06Q 30/0267 705/14.45 |

OTHER PUBLICATIONS

European Search Report: by: Tiago Pinheiro, dated Sep. 14, 2017.
(Continued)

*Primary Examiner* — Azam A Ansari
(74) *Attorney, Agent, or Firm* — Ming Jiang; MM IP Services LLC (57) ABSTRACT

The present disclosure relates to a mobile media delivery system. In certain embodiments, mobile media delivery system has a mobile media delivery controller and a mobile media delivery device. Mobile media delivery device delivers a set of digital media according to a set of corresponding delivery instructions. Mobile media delivery controller includes a processor and a memory. Memory includes a media storage and a firmware. Firmware stores computer executable instructions. When executed by processor, computer executable instructions cause processor to: send GPS location information of mobile media delivery controller to a mobile media delivery server, receive set of digital media and set of corresponding delivery instructions from mobile media delivery server based on GPS location information, store set of digital media and set of corresponding delivery instructions received in a media storage, and deliver set of digital media to mobile media delivery device according to set of corresponding delivery instructions.

14 Claims, 3 Drawing Sheets

(56) References Cited

OTHER PUBLICATIONS

EP Search Report Received EP Law Firm Weickmann & Weickmann dated Sep. 22, 2017.
U.S. Appl. No. 15/644,818, entitled "Mobile Media Delivery System and Methods of Using the Same", Filed on Jul. 9, 2017, by David Quan He, and Ming Jiang.
U.S. Appl. No. 15/657,196, entitled "Mobile Advertisement Systems and Methods of Using the Same", Filed on Jul. 23, 2017, by David Quan He, and Ming Jiang.
U.S. Appl. No. 15/702,701, entitled "In-Vehicle Advertisement Display Systems For Mobile Advertisement Systems", Filed on Sep. 12, 2017, by Ming Jiang, and David Quan He.

* cited by examiner

MOBILE MEDIA DELIVERY SYSTEM AND METHODS OF USING THE SAME

FIELD

The present disclosure generally relates to digital media, and more particularly to a mobile media delivery system and methods of using the mobile media delivery system.

BACKGROUND

The conventional digital media display may be divided into three general areas: commercial, informational, and personal. Typical commercial information display includes advertisements. Such advertisements can be seen on billboards along the roadside, posters displayed in store front, or sometimes on automobiles. Most of these advertisements have fixed contents, and are displayed in fixed locations. Informational media display such as news flash, breaking news, political posters and traffic directional displays are mostly fixed in locations. Personal information display such as stickers displayed on automobiles can be moved around and fun. However, these stickers are permanently affixed on the surfaces of the automobiles, and their contents may not be changed. For example, people hesitate to put any political stickers on their automobiles, because it is very difficult to remove them after the campaign is over. On the other hand, when people want to display some temporary messages such as "Just Married", or "Happy Birthday Mom" have to use washable paint so that these personal information displays may be removed without causing damages to the automobiles. Therefore, conventional digital media display is limited by the fixed contents and/or fixed location.

Therefore, an unaddressed need exists in the art to address the aforementioned deficiencies and inadequacies.

SUMMARY

In one aspect, the present disclosure relates to a mobile media delivery system. In certain embodiments, the mobile media delivery system includes a mobile media delivery controller and a mobile media delivery device. The mobile media delivery device delivers a set of digital media according to a set of corresponding delivery instructions. The set of digital media and the set of corresponding delivery instructions are provided by a mobile media delivery server remotely over a network. The mobile media delivery controller includes a processor, and a memory. The memory includes a media storage, and a firmware. The media storage stores the set of digital media and the set of corresponding delivery instructions. The firmware stores computer executable instructions. When executed by the processor, the computer executable instructions cause the processor to: send Global Positioning System (GPS) location information of the mobile media delivery controller to the mobile media delivery server over the network, receive the set of digital media and the set of corresponding delivery instructions from the mobile media delivery server based on the GPS location information sent, store the set of digital media and the set of corresponding delivery instructions received in the media storage, and deliver the set of digital media to the mobile media delivery device according to the set of corresponding delivery instructions.

In certain embodiments, when executed by the processor, the computer executable instructions in the firmware cause the processor to: send confirmation information back to the mobile media delivery server after one or more of the set of digital media is delivered by a network communication module of the mobile media delivery device over the network. The confirmation information may include: the time of the delivery of each of the set of digital media, the location of the delivery of each of the set of digital media, and total time of the delivery of each of the set of digital media.

In certain embodiments, when executed by the processor, the computer executable instructions in the firmware cause the processor to: retrieve a set of local digital media and a set of corresponding local delivery instructions through a USB interface of the mobile media delivery controller when the set of local digital media and the set of corresponding local delivery instructions are available, store the set of local digital media and the set of corresponding local delivery instructions retrieved in the media storage, and deliver the set of local digital media through the mobile media delivery device according to the set of corresponding local delivery instructions.

In certain embodiments, the mobile media delivery device includes: an image projector, a video projector, a laser image projector, a light-emitting diode (LED) display screen, an organic light-emitting diode (OLED) display screen, and a liquid crystal display (LCD) screen.

In another aspect, the present disclosure relates to a method of using a mobile media delivery system. In certain embodiments, the method includes: establishing network communication over a network to a mobile media delivery server through a network communication module of a mobile media delivery controller, sending GPS location information of the mobile media delivery system to the mobile media delivery server through the network communication module, sending, by the mobile media delivery server, a set of digital media and a set of corresponding delivery instructions based on the GPS location information received to the network communication module over the network, receiving, by the network communication module, the set of digital media and the set of corresponding delivery instructions from the mobile media delivery server, storing, by the network communication module, the set of digital media and the set of corresponding delivery instructions received in a media storage, and delivering, by a mobile media delivery device, the set of digital media according to the set of corresponding delivery instructions.

In certain embodiments, the method includes: sending, by the network communication module, confirmation information back to the mobile media delivery server after one or more of the set of digital media is delivered by the mobile media delivery device over the network. The confirmation information may include: the time of the delivery of each of the set of digital media, the location of the delivery of each of the set of digital media, and total time of the delivery of each of the set of digital media.

In certain embodiments, the method includes: retrieving, by the mobile media delivery controller, a set of local digital media and a set of corresponding local delivery instructions from a USB interface of the mobile media delivery controller when the set of local digital media and the set of corresponding local delivery instructions are available, storing, by the USB interface, the set of local digital media and the set of corresponding local delivery instructions retrieved in the media storage, and delivering, by the mobile media control module, the set of local digital media to the mobile media delivery device according to the set of corresponding local delivery instructions.

In yet another aspect, the present disclosure relates to a non-transitory computer storage medium. The non-transitory computer storage medium stores computer-executable instructions. When the computer-executable instructions are executed by a processor of a mobile media delivery controller of a mobile media delivery system, the computer-executable instructions cause the processor to: send GPS location information of the mobile media delivery system to a mobile media delivery server through a network communication module over a network, receive a set of digital media and a set of corresponding delivery instructions from the mobile media delivery server based on the GPS location information sent, store the set of digital media and the set of corresponding delivery instructions received in a media storage, and deliver the set of digital media to a mobile media delivery device according to the set of corresponding delivery instructions.

When the computer-executable instructions are executed by the processor, the computer-executable instructions cause the processor to: retrieve a set of local digital media and a set of corresponding local delivery instructions from a USB interface of the mobile media delivery controller when the set of local digital media and the set of corresponding local delivery instructions are available, store the set of local digital media and the set of corresponding local delivery instructions retrieved in the media storage, and deliver the set of local digital media to the mobile media delivery device according to the set of corresponding local delivery instructions.

In certain embodiments, the mobile media delivery system includes: the mobile media delivery device and the mobile media delivery controller. The mobile media delivery device delivers the set of digital media according to the set of corresponding delivery instructions. The mobile media delivery controller includes the processor and the memory. The memory includes the media storage for storing the set of digital media and the set of corresponding delivery instructions, and a firmware storing computer executable instructions. When executed by the processor, the computer executable instructions cause the processor to: send GPS location information of the mobile media delivery controller to the mobile media delivery server over the network, receive the set of digital media and the set of corresponding delivery instructions from the mobile media delivery server based on the GPS location information sent, receive the set of local digital media and the set of corresponding local delivery instructions from the mobile media delivery server based on the GPS location information sent, store the set of digital media and the set of corresponding delivery instructions and the set of local digital media and the set of corresponding local delivery instructions in the media storage, deliver the set of digital media to the mobile media delivery device according to the set of corresponding delivery instructions and the set of local digital media to the mobile media delivery device according to the set of corresponding local delivery instructions.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The description will be made as to the embodiments of the present disclosure in conjunction with the accompanying drawings FIGS. 1 through 3.

Figure 1:
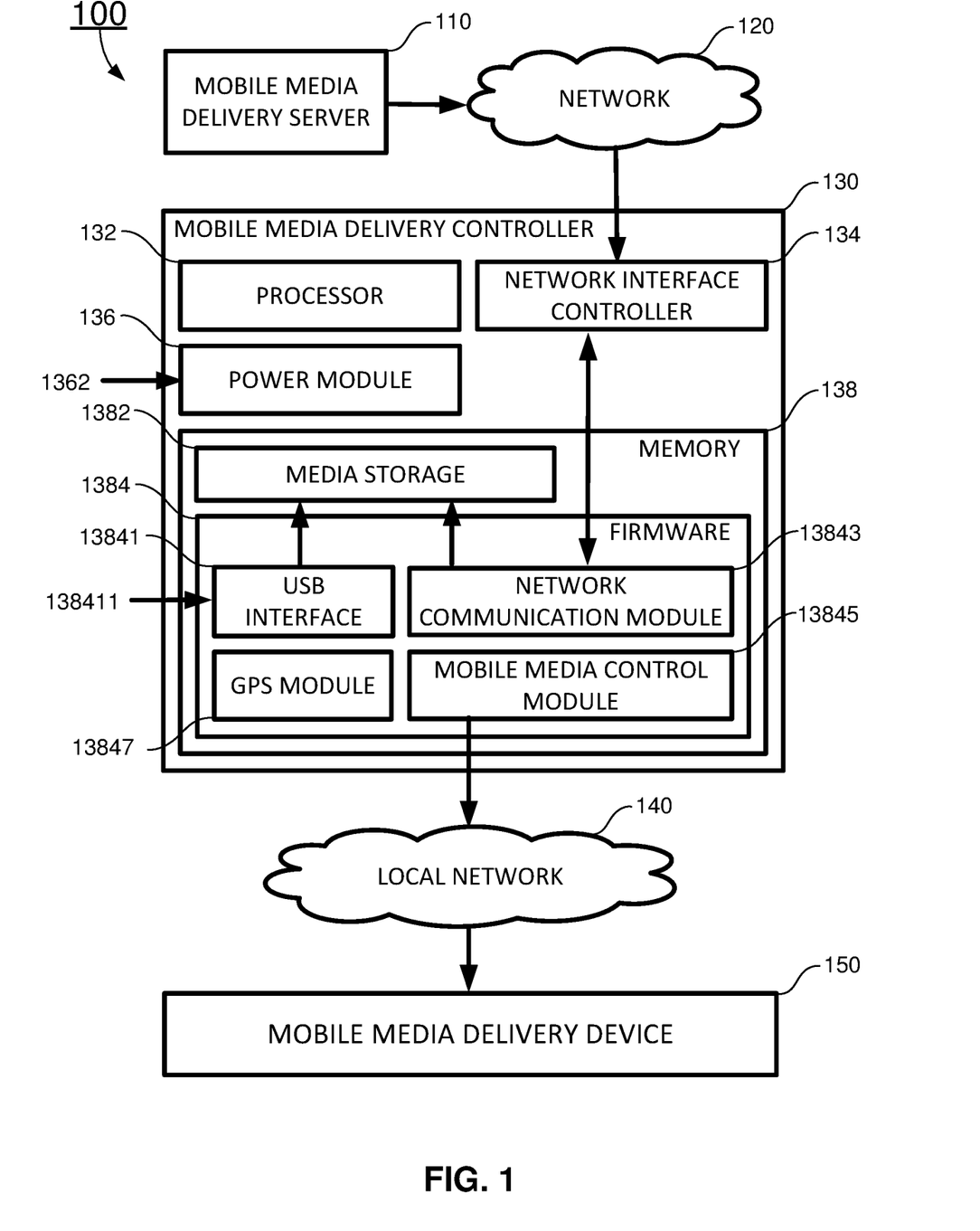
FIG. 1 schematically shows a block diagram of a mobile media delivery system according to certain embodiments of the present disclosure.

Referring now to FIG. 1, in one aspect, the present disclosure relates to a mobile media delivery system 100. In certain embodiments, the mobile media delivery system 100 includes a mobile media delivery controller 130 and a mobile media delivery device 150.

In certain embodiments, a mobile media delivery server 110 is connected to the mobile media delivery system 100 through a network 120. The network 120 may be a wireless network. The network 120 includes the internet, a wireless network, mobile communication network, Wi-Fi network, Zigbee personal area network, and Bluetooth network. The mobile media delivery server 110 manages all mobile media delivery system 100 connected to it and is a central location for a collection of any digital media to be delivered through the mobile media delivery system 100. When a mobile media delivery system 100 is powered up, the mobile media delivery system 100 establishes communication through the mobile media delivery controller 130, and sends its GPS location information to the mobile media delivery server 110, and then the mobile media delivery server 110 sends a set of digital media and corresponding delivery instructions in response to the mobile media delivery controller 130 according to the GPS location information of the mobile media delivery system 100. In one embodiment, the mobile media delivery system 100 is operated as a mobile digital advertisement system, and the mobile media delivery server 110 provides all advertisements including location-based advertisements, advertisement delivery instructions for each of the advertisement dispatched, and receives feedback of the accounting information of the advertisements from the mobile media delivery system 100.

In certain embodiments, the mobile media delivery controller 130 is a bridge between the mobile media delivery system 100 and the mobile media delivery server 110. The mobile media delivery controller 130 includes a processor 132, a network interface controller 134, a power module 136, and a memory 138. The power module 136 indicates the mobile media delivery system 100 is powered on when a power input 1362 is connected to and switched on to a power supply. The power input 1362 may include a regular 120V alternate current (AC) power supply, or a 12 V direct current (DC) power supply as often available on automobiles. The network interface controller 134 establishes network communication between the mobile media delivery system 100 and the mobile media delivery server 110.

In certain embodiments, the memory 138 includes a media storage 1382, and a firmware 1384. The media storage 1382 stores the set of digital media and the set of corresponding delivery instructions. The firmware 1384 includes a USB interface 13841, a GPS module 13847, a network communication module 13843, and a mobile media control module 13845. The USB interface 13841 may be used to retrieve a set of local digital media 138411 and a set of corresponding local delivery instructions. The mobile media delivery controller 130 checks if the set of local digital media 138411 and the set of corresponding delivery instructions are available through the USB interface 13841. If they are available, the mobile media delivery controller 130 retrieves the set of local digital media 138411 and the set of corresponding delivery instructions through the USB interface 13841, and stores the set of local digital media 138411 and the set of corresponding delivery instructions retrieved in the media storage 1382. The GPS module 13847 detects the GPS location information of the mobile media delivery system 100. The network communication module 13845 establishes and maintains communication between the mobile media delivery controller 130 and the mobile media delivery server 110 through the network interface controller 134 and the network 120. The GPS location information of the mobile media delivery system 100 is detected by the GPS module 13847 and sent to the mobile media delivery server 110 by the network communication module 13843 and the network interface controller 134 through the network 120.

In certain embodiments, the mobile media control module 13845 stores computer executable instructions. When executed by the processor 132, the computer executable instructions of the mobile media control module 13845 cause the processor 132 to: send Global Positioning System (GPS) location information of the mobile media delivery controller 130 to the mobile media delivery server 110 over the network 120, receive the set of digital media and the set of corresponding delivery instructions from the mobile media delivery server 110 based on the GPS location information sent, store the set of digital media and the set of corresponding delivery instructions received in the media storage 1382, and deliver the set of digital media to the mobile media delivery device 150 according to the set of corresponding delivery instructions.

In certain embodiments, the transmission of the set of digital media and the set of corresponding delivery instructions to the mobile media delivery device 150 may include a local network 140. This local network 140 may include an HDMI cable, a RCA cable, a video cable, a Wi-Fi network, a Bluetooth network, and any other wired or wireless networks.

In certain embodiments, the set of digital media includes: one or more banners, one or more digital images, one or more messages in text form, one or more animations, one or more videos, and one or more amber alerts.

In certain embodiments, each of the set of corresponding delivery instructions corresponds to one of the set of digital media. Each of the set of corresponding delivery instructions includes: a first time period and a first location information. The mobile media delivery device 150 delivers the set of digital media when the mobile media delivery system 100 is positioned in the region specified by the first location information and during the first time period.

In certain embodiments, when executed by the processor 132, the computer executable instructions of the mobile media control module 13845 cause the processor 132 to: send confirmation information back to the mobile media delivery server 110 after one or more of the set of digital media is delivered by the network communication module 13843 of the mobile media delivery device 150 over the network 120. The confirmation information may include: the time of the delivery of each of the set of digital media, the location of the delivery of each of the set of digital media, and total time of the delivery of each of the set of digital media. In one embodiment, the mobile media delivery system 100 is a mobile advertisement system. The confirmation information may be used to account for the final results of the advertisements delivered so the mobile media delivery system 100 may use the confirmation information to charge the advertisers.

In certain embodiments, the mobile media delivery device 150 include: an image projector, a video projector, a laser image projector, a light-emitting diode (LED) display screen, an organic light-emitting diode (OLED) display screen, and a liquid crystal display (LCD) screen.

In certain embodiments, when the mobile media delivery system 100 is mounted on an automobile, the mobile media delivery device 150 may include an image projector, a video projector, a laser image projector. These projectors project images and videos on back window and/or side windows of the automobile. In certain embodiments, the projector may be mounted on either side or both sides of the rearview mirrors to project images and/or videos either or both side doors. In certain embodiments, the mobile media delivery device 150 may include an LED display screen and an LCD display screen mounted inside of the automobile, or embedded within the back window glass, or the side window glass. In certain embodiments, the mobile media delivery device 150 may include an OLED display screen. The OLED display screen may be mounted on the back window, side windows, the body of the automobile including the front and/or rear bumpers, the back door/trunk door, or anywhere on the body of the automobile.

Figure 2:
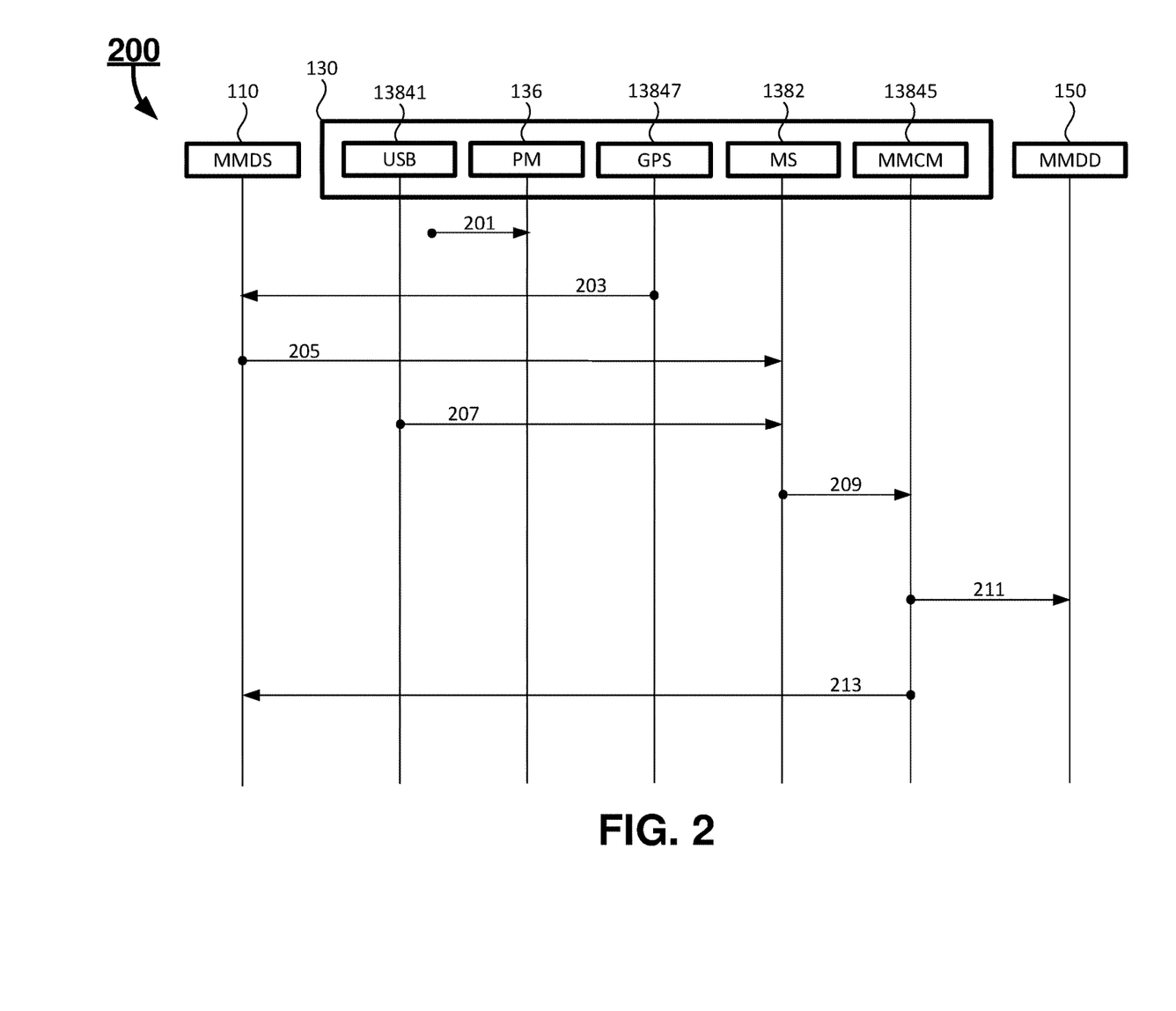
FIG. 2 shows a data flow chart of the mobile media delivery system according to certain embodiments of the present disclosure.

Referring now to FIG. 2, a data flow chart of the mobile media delivery system is shown according to certain embodiments of the present disclosure. The mobile media delivery system 100 includes: the mobile media delivery server (MMDS) 110, the mobile media delivery controller 130, and the mobile media delivery controller (MMDC) 150. The mobile media delivery controller 130 further includes: the USB interface (USB) 13841, the power module (PM) 136, the GPS module (GPS) 13847, the media storage (MS) 1382, and the mobile media control module (MMDM) 13845.

In certain embodiments, a user turns on the power module 136 of the mobile media delivery controller 130 as shown as operation 201. For a mobile media delivery system 100 mounted on an automobile, the power module 136 may be connected to the power source of the automobile. When the user turns on the automobile, the power module 136 of the mobile media delivery system 100 is turned on.

At operation 203, the mobile media delivery controller 130 establishes network communication with the mobile media delivery server over a network 120, the GPS module 13847 detects the GPS location information of the mobile media delivery system 100, and sends the GPS location information of the mobile media delivery system 100 detected to the mobile media delivery server 110.

At operation 205, in response to the GPS location information of the mobile media delivery system 100 sent to the mobile media delivery server 110, the mobile media delivery server 110 sends a set of digital media and a set of corresponding delivery instructions to the mobile media delivery controller 130 over the network 120. The mobile media delivery controller 130 receives the set of digital media and the set of corresponding delivery instructions from the mobile media delivery server 110 through the network 120, the network interface controller 134, and the network communication module 13843, and stores the set of digital media and the set of corresponding delivery instructions received in the media storage 1382.

In certain embodiments, the set of digital media includes: one or more banners, one or more digital images, one or more messages in text form, one or more animations, one or more videos, and one or more amber alerts. Each of the delivery instructions includes: a first time period and a first location information. The mobile media delivery device 150 delivers the set of digital media when the mobile media delivery system 100 is positioned in the region specified by the first location information and during the first time period. Each of the local delivery instructions corresponds to one of the set of local digital media 138411.

In certain embodiments, the mobile media delivery system 100 may also include the USB interface (USB) 156 for retrieving a set of local digital media 138411 and its corresponding local delivery instructions. At operation 207, the mobile media delivery controller 130 checks if the set of local digital media 138411 and the set of corresponding local delivery instructions are available through the USB interface 13841. If they are available, the mobile media delivery controller 130 retrieves the set of local digital media 138411 and the set of corresponding local delivery instructions through the USB interface 13841, and stores the set of local digital media 138411 and the set of corresponding local delivery instructions retrieved in the media storage 1382.

In certain embodiments, the set of local digital media 138411 includes: one or more banners, one or more digital images, one or more messages in text form, one or more animations, and one or more videos. Each of the local delivery instructions includes: a second time period and a second location information. The mobile media delivery device 150 delivers the set of local digital media 138411 when the mobile media delivery system 100 is positioned in the region specified by the second location information and during the second time period. The set of local digital media 138411 stored in the media storage 1382 may include: one or more banners, one or more digital images, one or more messages in text form, one or more animations, and one or more videos.

At operation 209, the mobile media control module 13845 retrieves the set of digital media and the set of corresponding delivery instructions, and the set of local digital media 138411 and the set of corresponding local delivery instructions from the media storage 1382.

At operation 211, the mobile media control module 13845 sends the set of digital media and the set of corresponding delivery instructions, and the set of local digital media 138411 and the set of corresponding local delivery instructions stored in the media storage 1382 to the mobile media delivery device 150. The mobile media delivery device 150 delivers the set of digital media and the set of local digital media 138411 according to the corresponding delivery instructions and the set of corresponding local delivery instructions, respectively. In certain embodiments, each of the delivery instructions corresponds to one of the set of digital media, and each of the local delivery instructions corresponds to one of the set of local digital media 138411.

At operation 213, the mobile media control module 13845 sends confirmation information back to the mobile media delivery server 110 after one or more of the set of digital media and/or one or more of the set of local digital media 138411 are delivered by the mobile media delivery device 150 through the network interface controller 134 and the network 120. The confirmation information includes: the time of the delivery of each of the set of digital media, the location of the delivery of each of the set of digital media, and total time of the delivery of each of the set of digital media. In one embodiment, the mobile media delivery system 100 is a mobile advertisement system. The confirmation information may be used to account for the final results of the advertisements delivered so the mobile media delivery system 100 may use the confirmation information to charge the advertisers.

Figure 3:
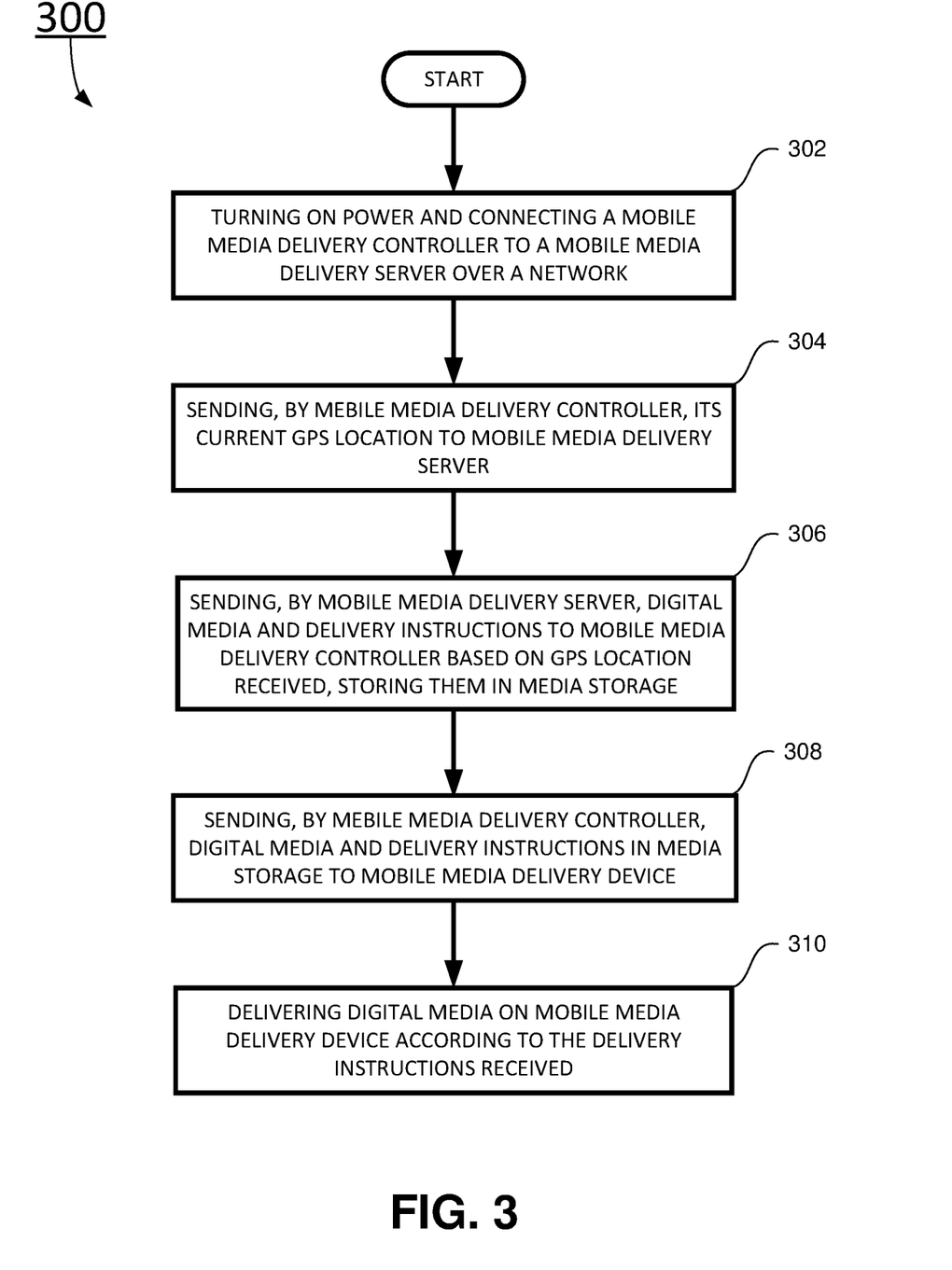
FIG. 3 shows a flow chart of a method of using the mobile media delivery system according to certain embodiments of the present disclosure.

Referring now to FIG. 3, in another aspect, the present disclosure relates to a method 300 of using the mobile media delivery system 100.

At block 302, after the user turns on the electric power 1362 through the power module 136, the mobile media delivery controller 130 establishes network communication to the mobile media delivery server 110 over the network 120.

At block 304, once the network communication to the mobile media delivery server 110 over the network 120 is established, the GPS module 13847 of the mobile media delivery controller 130 detects the GPS location information of the mobile media delivery system 100, and sends the GPS location information of the mobile media delivery system 100 to the mobile media delivery server 110 through the network 120.

At block 306, the mobile media delivery server 110 sends a set of digital media and a set of corresponding delivery instructions back to the mobile media delivery controller 130 based on the GPS location information of the mobile media delivery system 100. The mobile media delivery controller 130 then stores the set of digital media and the set of corresponding delivery instructions in the media storage 1382 of the mobile media delivery controller 130.

In certain embodiments, the mobile media delivery controller 130 checks if the set of local digital media 138411 and the set of corresponding local delivery instructions are available through the USB interface 13841. If they are available, the mobile media delivery controller 130 retrieves the set of local digital media 138411 and the set of corresponding local delivery instructions through the USB interface 13841, and stores the set of local digital media 138411 and the set of corresponding local delivery instructions retrieved in the media storage 1382.

At block 308, the mobile media delivery controller 130 retrieves the set of digital media and the set of corresponding delivery instructions from the media storage 1382 and sends the set of digital media and the set of corresponding delivery instructions retrieved to the mobile media delivery device 150 for delivery. In certain embodiments, the mobile media delivery controller 130 also retrieves a set of local digital media 138411 and its corresponding local delivery instructions from the USB interface 13841 and stores the set of local digital media 138411 and the set of corresponding local delivery instructions in the media storage 1382 of the mobile media delivery controller 130.

In certain embodiments, the set of digital media includes: one or more banners, one or more digital images, one or more messages in text form, one or more animations, one or more videos, and one or more amber alerts. Each of the delivery instructions corresponds to one of the set of digital media. Each of the delivery instructions includes: a first time period and a first location information.

In certain embodiments, the set of local digital media 138411 includes: one or more banners, one or more digital images, one or more messages in text form, one or more animations, and one or more videos. Each of the local delivery instructions corresponds to one of the set of local digital media 138411. Each of the local delivery instructions includes: a second time period and a second location information.

At block 310, the mobile media delivery device 150 delivers the set of digital media according to the set of corresponding delivery instructions and the set of local digital media 138411 according to the set of corresponding local delivery instructions, respectively.

The mobile media delivery device 150 delivers the set of digital media when the mobile media delivery system 100 is positioned in the region specified by the first location information and during the first time period.

The mobile media delivery device 150 delivers the set of local digital media 138411 when the mobile media delivery system 100 is positioned in the region specified by the second location information and during the second time period.

In certain embodiments, the mobile media control module 13845 sends confirmation information back to the mobile media delivery server 110 after one or more of the set of digital media and/or one or more of the set of local digital media 138411 are delivered by the mobile media delivery device 150 through the network interface controller 134 and the network 120. The confirmation information includes: the time of the delivery of each of the set of digital media, the location of the delivery of each of the set of digital media, and total time of the delivery of each of the set of digital media.

In yet another aspect, the present disclosure relates to a non-transitory computer storage medium. The non-transitory computer storage medium stores computer-executable instructions. When the computer-executable instructions are executed by a processor 132 of a mobile media delivery controller 130 of a mobile media delivery system 100, the computer-executable instructions cause the processor 132 to:

send GPS location information of the mobile media delivery system 100 to a mobile media delivery server 110 through a network communication module 13843 over a network 120;

receive a set of digital media and a set of corresponding delivery instructions from the mobile media delivery server 110 based on the GPS location information sent, store the set of digital media and the set of corresponding delivery instructions received in a media storage 1382; and deliver the set of digital media to a mobile media delivery device 150 according to the set of corresponding delivery instructions.

In certain embodiments, each of the set of corresponding delivery instructions corresponds to one of the set of digital media. Each of the set of corresponding delivery instructions includes: a first time period and a first location information. The mobile media delivery device 150 delivers the set of digital media when the mobile media delivery system 100 is positioned in the region specified by the first location information and during the first time period.

When the computer-executable instructions are executed by the processor 132, the computer-executable instructions cause the processor 132 to:

retrieve a set of local digital media 138411 and a set of corresponding local delivery instructions from a USB interface 13841 of the mobile media delivery controller 130 when the set of local digital media 138411 and the set of corresponding local delivery instructions are available, store the set of local digital media 138411 and the set of corresponding local delivery instructions retrieved in the media storage 1382; and deliver the set of local digital media 138411 to the mobile media delivery device 150 according to the set of corresponding local delivery instructions.

In certain embodiments, each of the set of corresponding local delivery instructions corresponds to one of the set of local digital media 138411. Each of the set of corresponding local delivery instructions includes: a second time period and a second location information. The mobile media delivery device 150 delivers the set of local digital media 138411 when the mobile media delivery system 100 is positioned in the region specified by the second location information and during the second time period.

In certain embodiments, the mobile media delivery system 100 includes: the mobile media delivery device 150 and the mobile media delivery controller 130. The mobile media delivery device 150 delivers the set of digital media according to the set of corresponding delivery instructions. The mobile media delivery controller 130 includes the processor 132 and the memory 138. The memory 138 includes the media storage 1382 for storing the set of digital media and the set of corresponding delivery instructions, and the firmware 1384 storing computer executable instructions. When executed by the processor 132, the computer executable instructions cause the processor 132 to:

send GPS location information of the mobile media delivery system 100 to the mobile media delivery server 110 over the network 120;

receive the set of digital media and the set of corresponding delivery instructions from the mobile media delivery server 110 based on the GPS location information sent;

retrieve the set of local digital media 138411 and the set of corresponding local delivery instructions from the mobile media delivery server 110;

store the set of digital media and the set of corresponding delivery instructions, and the set of local digital media 138411 and the set of corresponding local delivery instructions in the media storage 1382; and deliver the set of digital media to the mobile media delivery device 150 according to the set of corresponding delivery instructions, and the set of local digital media 138411 to the mobile media delivery device 150 according to the set of corresponding local delivery instructions, respectively.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims, the foregoing description and the exemplary embodiments described therein, and accompanying drawings.

What is claimed is:

1. A mobile media delivery platform, comprising:

a plurality of mobile media delivery systems, wherein each of the plurality of mobile media delivery systems is mounted in a traveling vehicle to deliver a plurality of digital media according to a plurality of delivery instructions; and a mobile media delivery server for receiving Global Positioning System (GPS) location information of the plurality of mobile media delivery systems from their corresponding vehicles detected in real time by GPS modules of the plurality of mobile media delivery systems, and dynamically providing the plurality of digital media and the plurality of delivery instructions to the plurality of mobile media delivery systems in their corresponding vehicles over a network based on the GPS location information received respectively, wherein each of the plurality of mobile media delivery systems comprises:

a mobile media delivery device for delivering the plurality of digital media according to the plurality of delivery instructions to people around the traveling vehicle carrying the mobile media delivery device, wherein the plurality of digital media and the plurality of delivery instructions are received from a mobile media delivery controller from the mobile media delivery server remotely over the network, wherein the mobile media delivery device comprises: an image projector; a video projector; a laser image projector; a light-emitting diode (LED) display screen; an organic light-emitting diode (OLED) display screen; and a liquid crystal display (LCD) screen; and a mobile media delivery controller having a processor, and a memory wherein the memory comprises a media storage for storing the plurality of digital media and the plurality of delivery instructions, and a firmware having the GPS module to detect the GPS location of the traveling vehicle carrying the mobile media delivery system, and storing computer executable instructions, when executed by the processor, the computer executable instructions cause the processor to:

detect, via the GPS module of the mobile media delivery controller, the GPS location information of the traveling vehicle carrying the mobile media delivery system;

send the GPS location information of the traveling vehicle carrying the mobile media delivery system detected by the GPS module to the mobile media delivery server over the network;

receive dynamically the plurality of digital media and the plurality of delivery instructions from the mobile media delivery server based on the GPS location information of the traveling vehicle sent, and retrieve a plurality of local digital media and a plurality of local delivery instructions through a USB interface when the plurality of local digital media and the plurality of local delivery instructions are available;

store the plurality of digital media and the plurality of delivery instructions received in the media storage, and store the plurality of local digital media and the plurality of local delivery instructions retrieved in the media storage;

broadcast the plurality of digital media through the mobile media delivery device on each traveling vehicle to people around the vehicle according to the plurality of delivery instructions, and deliver the plurality of local digital media through the mobile media delivery device according to the plurality of local delivery instructions; and send confirmation information back to the mobile media delivery server after each of the plurality of digital media is delivered by the mobile media delivery device through a network communication module over the network, wherein the confirmation information comprises: the time of the delivery of each of the plurality of digital media; the location of the delivery of each of the plurality of digital media, and total time of the delivery of each of the plurality of digital media, and the confirmation information is used to account for final results of the media delivery and to enable fair compensations for the media delivery.

2. The mobile media delivery system of claim 1, wherein the plurality of digital media comprises:
a plurality of banners;
a plurality of digital images;
a plurality of messages in text form;
a plurality of animations;
a plurality of videos; and
one or more amber alerts.

3. The mobile media delivery system of claim 1, wherein each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

4. The mobile media delivery system of claim 1, wherein the plurality of local digital media comprises: a plurality of banners; a plurality of digital images; a plurality of messages in text form; a plurality of animations; and a plurality of videos.

5. The mobile media delivery system of claim 1, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

6. A method of using a mobile media delivery system, comprising:

establishing, via a network communication module of a mobile media delivery controller of the mobile media delivery system, network communication over a network to a mobile media delivery server, wherein the mobile media delivery system is mounted in a traveling vehicle to deliver a plurality of digital media according to a plurality of delivery instructions;

detecting, via a Global Positioning System (GPS) module of the mobile media delivery controller, GPS location information of the traveling vehicle carrying the mobile media delivery system in real time while the vehicle is traveling;

sending, via the network communication module, the GPS location information of the traveling vehicle carrying the mobile media delivery system detected by the GPS module to the mobile media delivery server;

sending, by the mobile media delivery server, dynamically, a plurality of digital media and a plurality of delivery instructions to the mobile media delivery server while the vehicle is traveling based on the GPS location information received via the network communication module over the network;

receiving, dynamically, by the network communication module, the plurality of digital media and the plurality of delivery instructions from the mobile media delivery server, and retrieve a plurality of local digital media and a plurality of local delivery instructions through a USB interface when the plurality of local digital media and the plurality of local delivery instructions are available;

storing, by the network communication module, the plurality of digital media and the plurality of delivery instructions received in a media storage, and store the plurality of local digital media and the plurality of local delivery instructions retrieved in the media storage;

broadcasting, by a mobile media delivery device, the plurality of digital media according to the plurality of delivery instructions to people around the traveling vehicle, and delivering the plurality of local digital media through the mobile media delivery device according to the plurality of local delivery instructions, wherein the mobile media delivery device comprises: an image projector; a video projector; a laser image projector; a light-emitting diode (LED) display screen; an organic light-emitting diode (OLED) display screen; and a liquid crystal display (LCD) screen; and sending, by the network communication module, confirmation information back to the mobile media delivery server after each of the plurality of digital media is delivered by the mobile media delivery device over the network, wherein the confirmation information comprises: the time of the delivery of each of the plurality of digital media; the location of the delivery of each of the plurality of digital media, and total time of the delivery of each of the plurality of digital media, and the confirmation information is used to account for final results of the media delivery and to enable fair compensations for the media delivery.

7. The method of claim 6, wherein the plurality of digital media comprises:
a plurality of banners;
a plurality of digital images;

a plurality of messages in text form;
a plurality of animations;
a plurality of videos; and
one or more amber alerts.

8. The method of claim 6, wherein each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

9. The method of claim 4, wherein the plurality of digital media comprises: a plurality of banners; a plurality of digital images; a plurality of messages in text form; a plurality of animations; and a plurality of videos.

10. The method of claim 4, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

11. A non-transitory computer storage medium having computer-executable instructions stored thereon which, when executed by a processor of a mobile media delivery controller of a mobile media delivery system, cause the processor to:
   detect, via a Global Positioning System (GPS) module of the mobile media delivery controller of the mobile media delivery system, GPS location information of the mobile media delivery system in real time, wherein the mobile media delivery system is mounted in a traveling vehicle to deliver a plurality of digital media according to a plurality of delivery instructions;
   send the GPS location information of the traveling vehicle carrying the mobile media delivery system to a mobile media delivery server through a network communication module over a network;
   receive, dynamically the plurality of digital media and the plurality of delivery instructions from the mobile media delivery server based on the GPS location information of the traveling vehicle sent, and retrieve a plurality of local digital media and a plurality of local delivery instructions through a USB interface when the plurality of local digital media and the plurality of local delivery instructions are available;
   store the plurality of digital media and the plurality of delivery instructions received in a media storage of the mobile media delivery controller, and store the plurality of local digital media and the plurality of local delivery instructions retrieved in the media storage;
   broadcast the plurality of digital media to a mobile media delivery device according to the plurality of delivery instructions to people around the traveling vehicle, and delivering the plurality of local digital media through the mobile media delivery device according to the plurality of local delivery instructions, wherein the mobile media delivery device comprises: an image projector; a video projector; a laser image projector; a light-emitting diode (LED) display screen; an organic light-emitting diode (OLED) display screen; and a liquid crystal display (LCD) screen; and
   send confirmation information back to the mobile media delivery server after each of the plurality of digital media is delivered by the mobile media delivery device over the network, wherein the confirmation information comprises: the time of the delivery of each of the plurality of digital media; the location of the delivery of each of the plurality of digital media, and total time of the delivery of each of the plurality of digital media, and the confirmation information is used to account for final results of the media delivery and to enable fair compensations for the media delivery.

12. The non-transitory computer storage medium of claim 11, wherein each of the plurality of delivery instructions corresponds to one of the plurality of digital media, and each of the plurality of delivery instructions comprises: a first time period and a first location information, wherein the mobile media delivery device delivers the plurality of digital media when the mobile media delivery system is positioned in the region specified by the first location information and during the first time period.

13. The non-transitory computer storage medium of claim 8, wherein each of the plurality of local delivery instructions corresponds to one of the plurality of local digital media, and each of the plurality of local delivery instructions comprises: a second time period and a second location information, wherein the mobile media delivery device delivers the plurality of local digital media when the mobile media delivery system is positioned in the region specified by the second location information and during the second time period.

14. The non-transitory computer storage medium of claim 11, wherein the mobile media delivery system comprises:
   the mobile media delivery device for delivering the plurality of digital media according to the plurality of delivery instructions; and
   the mobile media delivery controller having the processor, and a memory wherein the memory comprises the media storage for storing the plurality of digital media and the plurality of delivery instructions, and a firmware storing computer executable instructions, when executed by the processor, the computer executable instructions cause the processor to:
      detect, via the GPS module of the mobile media delivery controller of the mobile media delivery system, GPS location information of the mobile media delivery system in real time, wherein the mobile media delivery system is mounted in a traveling vehicle to deliver a plurality of digital media according to a plurality of delivery instructions;
      send the GPS location information of the traveling vehicle carrying the mobile media delivery controller to the mobile media delivery server through the network communication module over the network;
      receive, dynamically, the plurality of digital media and the plurality of delivery instructions from the mobile media delivery server based on the GPS location information of the traveling vehicle sent;
      retrieve the plurality of local digital media and the plurality of local delivery instructions from the USB interface of the mobile media delivery controller;
      store the plurality of digital media and the plurality of delivery instructions, and the plurality of local digital media and the plurality of local delivery instructions in the media storage of the mobile media delivery controller;
      broadcast the plurality of digital media to the mobile media delivery device according to the plurality of delivery instructions, and the plurality of local digital media to the mobile media delivery device according to the plurality of corresponding local delivery instructions to people around the traveling vehicle, respectively; and send confirmation information back to the mobile media delivery server after more each of the plurality of digital media is delivered by the mobile media delivery device over the network, wherein the confirmation information comprises: the time of the delivery of each of the plurality of digital media; the location of the delivery of each of the plurality of digital media, and total time of the delivery of each of the plurality of digital media, and the confirmation information is used to account for final results of the media delivery and to enable fair compensations for the media delivery.

* * * * *